United States Patent [19]

Kerrom

[11] Patent Number: 4,702,656
[45] Date of Patent: Oct. 27, 1987

[54] EXPANSION BOLT ASSEMBLY

[75] Inventor: Roger Kerrom, Lörrach, Fed. Rep. of Germany

[73] Assignee: Hilti Aktiengesellschaft, Furstentum, Liechtenstein

[21] Appl. No.: 884,996

[22] Filed: Jul. 14, 1986

[30] Foreign Application Priority Data

Jul. 15, 1985 [DE] Fed. Rep. of Germany ....... 3525245

[51] Int. Cl.⁴ ............................................. F16B 13/06
[52] U.S. Cl. ....................................... 411/60; 411/45; 411/21
[58] Field of Search .................................... 411/21-23, 411/29-33, 44, 45, 54, 55, 41, 60, 64-68, 71, 72, 75

[56] References Cited

U.S. PATENT DOCUMENTS

| 1,031,462 | 7/1912 | Paine | 411/57 |
| 2,316,918 | 4/1943 | Wallace | 411/71 X |
| 3,269,251 | 8/1966 | Bass | 411/21 |
| 4,293,259 | 10/1981 | Liebig | 411/32 |
| 4,315,708 | 2/1982 | Leibig | 411/65 |
| 4,316,689 | 2/1982 | Velasco | 411/57 |
| 4,405,272 | 9/1983 | Wollar | 411/41 |
| 4,579,473 | 4/1986 | Brugger | 411/41 X |

FOREIGN PATENT DOCUMENTS

| 88732 | 1/1896 | Fed. Rep. of Germany | 411/71 |
| 2406207 | 8/1975 | Fed. Rep. of Germany | 411/64 |
| 0065721 | 1/1982 | Fed. Rep. of Germany | . |
| 3311264 | 4/1984 | Fed. Rep. of Germany | . |
| 3343016 | 6/1985 | Fed. Rep. of Germany | . |
| 3329732 | 7/1985 | Fed. Rep. of Germany | . |
| 3346537 | 7/1985 | Fed. Rep. of Germany | . |
| 24242 | 6/1901 | France | 411/64 |
| 328158 | 3/1976 | German Democratic Rep. | . |
| 357737 | 7/1980 | German Democratic Rep. | . |
| 48678 | 11/1930 | Norway | 411/60 |
| 618489 | 2/1949 | United Kingdom | 411/57 |
| 2090933 | 7/1982 | United Kingdom | 411/71 |

Primary Examiner—Neill Wilson
Attorney, Agent, or Firm—Toren, McGeady & Associates

[57] ABSTRACT

An expansion bolt assembly for use in boreholes with an annular undercut adjacent the base of the boreholes includes an axially elongated anchor bolt, a support sleeve laterally enclosing the anchor bolt with annular segments formed on the support sleeve, and an expansion sleeve to be inserted between the anchor bolt and the support sleeve. The annular segments are displaced radially outwardly by the expansion sleeve into the undercut in the borehole. The annular segments extend radially outwardly from the outside surface of the support sleeve. During the expansion procedure the outer surface of the support sleeve is pressed against the surface of the borehole.

10 Claims, 3 Drawing Figures

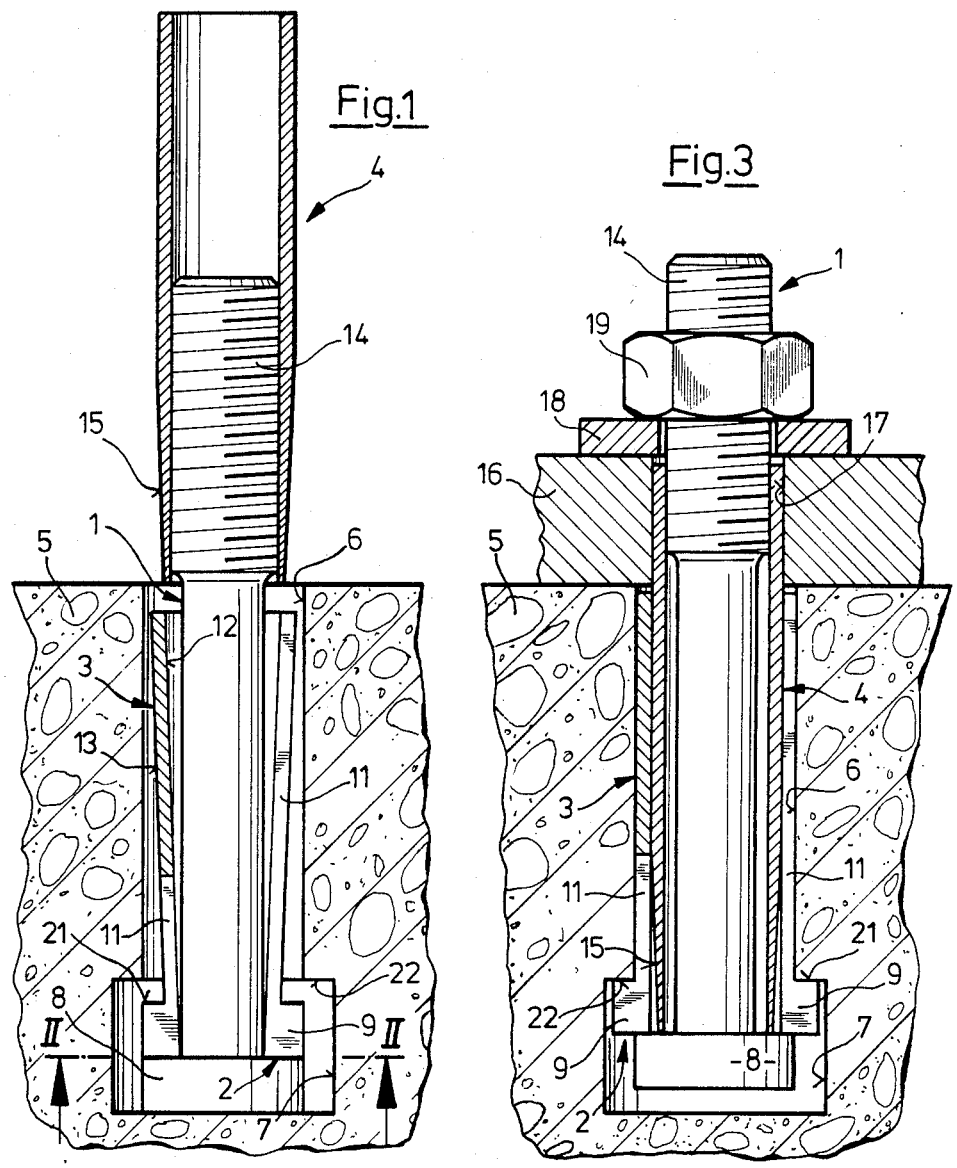

EXPANSION BOLT ASSEMBLY

BACKGROUND OF THE INVENTION

The present invention is directed to an expansion bolt assembly for use in boreholes having an annular undercut section near the base of the borehole. The assembly includes a plurality of annular segments in a ring-shaped arrangement which can be displaced radailly outwardly into the undercut section. An expansion sleeve is driven into the borehole and displaces the annular segments radially outwardly into the undercut section. An anchor bolt extends into the borehole and has a head at its end inserted first into the borehole whereby the head presses against the annular segments in the axial direction of the borehole for supporting the segments within the undercut section.

In a known expansion bolt assembly annular segments are displaced radially by an expansion sleeve and pressed into an undercut section of a borehole for effecting an anchorage. The expansion sleeve is displaced into the borehole until the annular segments abut against the radial base of the undercut section. Accordingly, the radial displacement of the annular segments and the axial displacement of the expansion sleeve is dependent on the radial depth of the undercut section. Such an expansion bolt assembly has considerable disadvantages including the possibility of insufficient absorption of transverse forces as well as a complicated structure. The complicated structure involves the annular segments fabricated as individual parts and retained in the expansion bolt assembly by an annular spring. To maintain uniform spacing between the annular segments, they are provided with leg-like projections extending into slot-like recesses.

SUMMARY OF THE INVENTION

Therefore, the primary object of the present invention is to provide an expansion bolt assembly for use in boreholes with an annular undercut section where the assembly is easily constructed, it can be installed in a simple manner and it is suitable for the absorption of transverse forces.

In accordance with the present invention, the annular segments are located on the end of a support sleeve and the segments extend radially outwardly beyond the outer surface of the support sleeve.

By providing the annular segments in a unitary member along with the support sleeve, it is easy to produce the expansion bolt assembly. The complicated handling of the annular segments experienced in the past is avoided. Due to its simple arrangement, the expansion bolt assembly affords a simplified insertion procedure in a borehole.

To displace the annular segment radially outwardly, the expansion sleeve is driven into the support sleeve so that it forces the annular segments radially outwardly. At the end of the radial expansion of the annular segments, the end of the expansion sleeve abuts against a head formed on the end of the anchor bolt inserted first into the borehole. As a result, in the expanded position, the trailing end of the expansion sleeve is always in a defined axial position relative to the support sleeve. This position indicates the proper engagement of the annular segments into the undercut section. When the expansion sleeve is driven in around the anchor bolt it expands the support sleeve radially with the outer surface of the support sleeve contacting the surface of the borehole. The radial depth of the undercut section is appropriately greater than the radial projection of the annular segments from the outer surface of the support sleeve.

In the expansion bolt assembly embodying the present invention, the annular segments extend in a positive locking manner into the undercut section and assume the actual load forces applied to the anchor bolt, while the support sleeve pressed against the borehole surface can absorb transverse forces. Preferably, the support sleeve extends in the borehole from adjacent the opening into the borehole, so that transverse forces are introduced into the receiving material along a considerable length of the borehole.

Insertion of the expansion sleeve into the support sleeve around the anchor bolt is facilitated by tapering the inner surface of the support sleeve conically in the direction of insertion. The tapered inner surface can extend up to the annular segments located at the leading end of the support sleeve, that is, the end inserted first into the borehole. Surface contact of the expansion sleeve with the inner surface of the support sleeve which tapers conically can be achieved by a correspondingly conically shaped outer surface on the expansion sleeve.

Another feature of the present invention is the shape of the axially extending outer surface of the support sleeve which tapers conically in the insertion direction. The wall thickness of the support sleeve is uniform along its entire axial length. Accordingly, an economical arrangement of the support sleeve is afforded as far as material and weight are concerned.

In one embodiment of the present invention, the annular segments protrude radially outwardly at least to the greatest outside diameter of the support sleeve. The greatest outside diameter of the support sleeve is located at its trailing end relative to the insertion direction. While the expansion bolt assembly is being set in a borehole, increasing radial tension force is developed due to the radial deformation of the support sleeve. Such force assures a dependable axial retention of the expansion sleeve and the support sleeve even under dynamic loading of the anchor bolt.

To ensure improved radial deformability, particularly if the support sleeve and the annular segments are formed of metal, axially extending slots are provided in the support sleeve extending from the spaces between the annular segments toward the opposite end of the support sleeve. Preferably there are at least three and a maximum of ten equally spaced annular segments with a corresponding number of axially extending slots formed in the support sleeve.

The axial slots have a length in the range of two to four times the axial dimension of the annular segments in a preferred embodiment of the invention. Appropriately, one of the axial slots extends along the full length of the support sleeve to facilitate the expansion of the sleeve over its entire length.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is an elevational view, partly in section, of an expansion bolt assembly embodying the present invention and displaying the assembly before it is expanded;

FIG. 2 is a cross-sectional view taken along the line II—II in FIG. 1; and

FIG. 3 is a view similar to FIG. 1, however, illustrating the expansion bolt assembly in the expanded state as in actual use.

DETAILED DESCRIPTION OF THE INVENTION

In FIG. 1 an expansion bolt assembly is shown inserted into a borehole 6 formed in a hard receiving material 5. At the base of the borehole an undercut section 7 is formed extending radially outwardly from the surface of the borehole for an axially extending part of the borehole at its base. The expansion bolt assembly and its various components each has a leading or first end which is inserted first into the borehole and a second or trailing end spaced axially from the first end in the direction opposite to the insertion direction of the assembly into the borehole. The expansion bolt assembly includes an axially extending anchor bolt 1, annular segments 2 secured to the first end of a support sleeve 3, and an expansion sleeve 4 positioned around the second end of the anchor bolt before the expansion procedure is effected. In FIG. 1 the annular segments are positioned radially inwardly from the undercut section 7 while in FIG. 3 the annular segments are shown, in the expanded condition, extending outwardly into the undercut section.

At its first end, the anchor bolt has a head 8 protruding radially outwardly from the adjacent outer surface of the bolt. When the anchor bolt is inserted into the borehole the head is placed in contact with the base of the borehole. During installation the support sleeve 3 laterally encloses the forward part of the anchor bolt between the head 8 and thread 14 extending around the anchor bolt from the second end of the head for an axially extending part of the bolt length. In the inserted position, as shown in FIG. 1, the annular segments 2 are located in the axially extending region of the undercut section 7 and contact the second end of the head 8. The axial length of the head 8 and the annular segments 2 is less than the axial length of the undercut section 7. As displayed in FIG. 2, the annular segments 2 are spaced apart in the circumferential direction by intermediate spaces 9. As illustrated, there are four annular segments evenly spaced apart by the intermediate spaces 9. The intermediate spaces 9 continue in the body of the support sleeve 3 as axially extending slots 11. While most of the slots 11 have an axial length as indicated on the left-hand side in FIG. 1, one of the slots 11 extends for the full axial length of the sleeve, note the right-hand side in FIG. 1. The inside surface 12 of the support sleeve is conically shaped in the axial direction so that it tapers inwardly from the second end to the annular segments 2 located at the first end. Similarly, the outer surface 13 of the support sleeve 3 has the same conical configuration whereby the sleeve has the same wall thickness for its full axial length.

The threaded section 14 of the anchor rod 1 extends out of the borehole 6. The expansion sleeve 4 is placed in sliding contact with the threaded section as can be seen in FIG. 1. The outer surface of the expansion sleeve 1 extending from the first end toward the second end is conically shaped corresponding to the conical shape of the inside surface 12 of the support sleeve 3. The conically shaped part of the expansion sleeve 4 extends only for a portion of its axial length.

To anchor the expansion bolt assembly, the expansion sleeve 4 is driven from the position shown in FIG. 1 into the borehole passing into the second end of the support sleeve 3. The expansion sleeve 4 is driven along the full axial length of the support sleeve until its first end contacts the second end of the head 8, note FIG. 3. A pipe-shaped driving tool, not shown, can be used for placing the expansion sleeve 4 in the anchored position. As the expansion sleeve 3 is driven forwardly into the borehole 6 within the support sleeve 3, the support sleeve and then the annular segments are forced radially outwardly. As a result, the annular segments 2 at the first end of the support sleeve 3 are moved outwardly into the undercut section 7. Further, during the anchoring step, the outer surface of the support sleeve moves into surface contact with the borehole wall.

The final position of the expansion bolt assembly as shown in FIG. 3 is reached when an object 16 is placed against the outside surface of the receiving material 5. The object 16 has an opening 17 which fits around the second end portion of the expansion sleeve 4 extending outwardly from the surface of the receiving material 5. A washer 18 is placed around the anchor bolt 1 and then a nut 18 is threaded onto the threaded section 14 of the bolt. As the nut 19 is tightened it presses the washer against the object 16 which, in turn, is pressed against the surface of the receiving material 5 and, as tightening proceeds, the anchor bolt moves in the direction out of the borehole with the head 8 pressing the annular segments 2 against a shoulder 21 formed by the undercut section 7. With the annular segments 2 bearing against the shoulder 21 and the head 8 holding the annular segments in position, further tightening secures the object 16 against the receiving material surface.

While specific embodiments of the invention have been shown and described in detail to illustrate the application of the inventive principles, it will be understood that the invention may be embodied otherwise without departing from such principles.

I claim:

1. An expansion bolt assembly for use in boreholes formed in the surface of hard receiving material where the borehole is undercut at a location spaced inwardly from the surface of the hard receiving material, said expansion bolt assembly comprises an axially extending anchor bolt, said anchor bolt having a first end and a second end with the first end arranged to be inserted first into the borehole, said anchor bolt having an axially and circumferentially extending outer surface, a head formed on the first end of said anchor bolt and projecting radially outwardly transversely of the axial direction of said anchor bolt beyond the outer surface of said anchor bolt, a plurality of annular segments spaced angularly apart and located in a ring-shaped arrangement around said anchor bolt adjacent the first end thereof, each said annular segment having a first surface extending radially relative to said anchor bolt axis and facing toward the first end of said anchor bolt and a second surface extending radially relative to said anchor bolt axis and facing toward the second end of said anchor bolt, an axially extending expansion sleeve extending around said anchor bolt and arranged to displace said annular segments radially outwardly into the undercut section in the borehole, said head arranged to contact the first surfaces of said annular segments, wherein the improvement comprises an axially extending support sleeve laterally encircling said anchor bolt and having a first end and a second end with the first end of said support sleeve arranged to be inserted first into the borehole and facing toward the first end of said anchor bolt, said support sleeve has an axially extending inner surface and an axially extending outer surface, said annular segments being secured unitarily to said support sleeve at the first end thereof, and the first and second surfaces of said annular segments projecting radially outwardly from the outer surface of said support sleeve at the first end thereof, said expansion sleeve being axially displaceable toward the first end of said bolt between the outer surface of said bolt and the inner surface of said support sleeve whereby said support sleeve and said annular segments are displaceable radially outwardly.

2. An expansion bolt assembly, as set forth in claim 1, wherein the inner surface of said support sleeve is conically shaped in the axial direction with the inner surface tapering inwardly from the second end to the first end of said support sleeve.

3. An expansion bolt assembly, as set forth in claim 1 or 2, wherein the outer surface of said support sleeve is conically shaped in the axial direction and tapers inwardly from the second end to the first end of said support sleeve.

4. An expansion bolt assembly, as set forth in claim 3, wherein said annular segments before displacement radially outwardly extend radially outwardly to at least the largest diameter of the outer surface of said support sleeve.

5. An expansion bolt assembly, as set forth in claim 1 or 2, wherein circumferentially extending intermediate spaces are located between adjacent said annular segments with said spaces extending for the axial dimension of said annular segments, and an axially extending slot formed in said support sleeve extending from each of said intermediate spaces for at least an axially extending portion of said support sleeve.

6. An expansion bolt assembly, as set forth in claim 3, wherein circumferentially extending intermediate spaces are located between adjacent said annular segments with said spaces extending for the axial dimension of said annular segments, and an axially extending slot formed in said support sleeve extending from each of said intermediate spaces for at least an axially extending portion of said support sleeve.

7. An expansion bolt assembly, as set forth in claim 5, wherein the axial dimension of said slots is in the range of two to four times the axial dimension of said annular segments.

8. An expansion bolt assembly, as set forth in claim 6, wherein the axial dimension of said slots is in the range of two to four times the axial dimension of said annular segments.

9. An expansion bolt assembly, as set forth in claim 5, wherein one said slot extends for the full axial length of said support sleeve from the annular segments to the second end thereof.

10. An expansion bolt assembly, as set forth in claim 2, wherein said expansion sleeve having a first end and a second end with the first end arranaged to be inserted first into the borehole, the outer surface of said expansion sleeve extending from the first end thereof for an axial portion of said expansion sleeve is conincally shaped with the conically shaped outer surface diverging in the direction from the first end toward the second end of said expansion sleeve.

* * * * *